United States Patent
Kim et al.

(10) Patent No.: US 10,807,904 B2
(45) Date of Patent: Oct. 20, 2020

(54) GLASS COMPOSITION AND COOKING APPLIANCE

(71) Applicant: LG ELECTRONICS INC., Seoul (KR)

(72) Inventors: Taehee Kim, Seoul (KR); Taeho Kim, Seoul (KR); Dongwan Seo, Seoul (KR); Yongsoo Lee, Seoul (KR); Suyeon Choi, Seoul (KR)

(73) Assignee: LG Electronics Inc., Seoul (KR)

(*) Notice: Subject to any disclaimer, the term of this patent is extended or adjusted under 35 U.S.C. 154(b) by 415 days.

(21) Appl. No.: 15/801,058

(22) Filed: Nov. 1, 2017

(65) Prior Publication Data

US 2019/0002336 A1 Jan. 3, 2019

(30) Foreign Application Priority Data

Jun. 28, 2017 (KR) .................. 10-2017-0081642

(51) Int. Cl.
| | | |
|---|---|---|
| *C03C 8/14* | (2006.01) | |
| *C03C 3/064* | (2006.01) | |
| *C03C 8/08* | (2006.01) | |
| *F24C 15/00* | (2006.01) | |
| *C09D 1/00* | (2006.01) | |
| *C09D 7/61* | (2018.01) | |

(Continued)

(52) U.S. Cl.
CPC ............... *C03C 8/14* (2013.01); *C03C 1/026* (2013.01); *C03C 3/064* (2013.01); *C03C 4/20* (2013.01); *C03C 8/08* (2013.01); *C03C 8/16* (2013.01); *C08G 77/12* (2013.01); *C09D 1/00* (2013.01); *C09D 7/61* (2018.01); *F24C 15/005* (2013.01); *H05B 3/74* (2013.01); *C03C 2205/04* (2013.01);

(Continued)

(58) Field of Classification Search
CPC ....... C03C 8/00–12; C03C 8/14; C03C 1/026; C03C 2205/04; C03C 2207/00; C03C 2207/02; C03C 3/064; C03C 4/20; C03C 8/16; C08G 77/12; C09D 1/00; C09D 7/61; C23D 5/00; F24C 15/005; H05B 3/74; H05B 6/6402
USPC ...................................................... 219/460.1
See application file for complete search history.

(56) References Cited

U.S. PATENT DOCUMENTS

| | | |
|---|---|---|
| 3,928,668 A | 12/1975 | Snow |
| 5,348,915 A | 9/1994 | Thometzek |

(Continued)

FOREIGN PATENT DOCUMENTS

| | | |
|---|---|---|
| DE | 102013015501 A1 | 4/2014 |
| EP | 0453897 A1 | 10/1991 |

(Continued)

*Primary Examiner* — Dana Ross
*Assistant Examiner* — Joe E Mills, Jr.
(74) *Attorney, Agent, or Firm* — Dentons US LLP (57) ABSTRACT

A glass composition includes a glass frit and an electrostatic force reinforcing material including polymethylhydrosiloxane derivatives. The electrostatic force reinforcing material is represented by the following Formula.

[Formula]

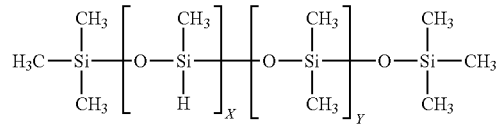

where X > 0, and Y > 0.

17 Claims, 3 Drawing Sheets

(51) Int. Cl.
    *C03C 8/16*       (2006.01)
    *C03C 1/02*       (2006.01)
    *C03C 4/20*       (2006.01)
    *C08G 77/12*     (2006.01)
    *H05B 3/74*       (2006.01)
    *C23D 5/00*       (2006.01)

(52) U.S. Cl.
    CPC ...... *C03C 2207/00* (2013.01); *C03C 2207/02* (2013.01); *C23D 5/00* (2013.01)

(56) References Cited

U.S. PATENT DOCUMENTS

| | | | |
|---|---|---|---|
| 6,492,623 B1* | 12/2002 | Vilato | F24C 15/102 |
| | | | 156/305 |
| 2003/0099574 A1* | 5/2003 | Bentsen | G01N 21/6408 |
| | | | 422/82.07 |
| 2007/0096617 A1* | 5/2007 | Hwang | H01J 29/02 |
| | | | 313/310 |
| 2008/0196627 A1 | 8/2008 | Sproson | |
| 2009/0148682 A1 | 6/2009 | Higuchi | |
| 2009/0162592 A1 | 6/2009 | Baikerikar et al. | |
| 2013/0045389 A1 | 2/2013 | Benford, Jr. et al. | |
| 2013/0299484 A1* | 11/2013 | Lee | F24C 15/005 |
| | | | 219/391 |
| 2019/0055155 A1* | 2/2019 | Sridharan | C03C 8/24 |

FOREIGN PATENT DOCUMENTS

| | | |
|---|---|---|
| KR | 10-2009-0037856 A | 4/2009 |
| KR | 10-2010-0103828 A | 9/2010 |
| KR | 10-2014-0115562 A | 10/2014 |

\* cited by examiner

GLASS COMPOSITION AND COOKING APPLIANCE

CROSS-REFERENCE TO RELATED APPLICATIONS

This application claims priority under 35 U.S.C. § 119 to Korean Patent Application No. 10-2017-0081642, filed on Jun. 28, 2017, the disclosure of which is incorporated herein by reference in its entirety.

TECHNICAL FIELD

The present disclosure relates to a glass composition and a cooking appliance including the same.

BACKGROUND

Enamel is a glass composition where a hyaline glaze is coated on a surface of a metal plate. Generally, enamel is applied to cooking appliances such as microwave ovens and ovens. Enamel is categorized into an acid-resisting enamel preventing oxidation and a heat-resisting enamel capable of enduring a high temperature, based on the kind of glaze and usability. Also, enamel is categorized into an aluminum enamel, a zirconium enamel, titanium enamel, and a soda glass enamel, based on materials added to enamel.

Generally, cooking appliances are appliances which heat and cook food by using a heating source. Food residues occurring in a cooking process are attached on an inner wall of a cavity of the appliance, and thus, when cooking of food is completed in the cooking appliance, it is required to clean the inside of the cavity. Also, food is cooked at a high temperature, and the inner wall of the cavity is exposed to an organic material and an alkali component. Therefore, in a case where enamel is used in a cooking appliance, the enamel needs a thermal resistance, a chemical resistance, a wear resistance, a pollution resistance, etc. For this reason, a composition for enamel for improving the thermal resistance, chemical resistance, wear resistance, and pollution resistance of enamel is needed.

Enamel may be coated on one surface of a parent material configuring a cooking appliance. However, a composition and/or a composition ratio of the enamel may be changed for improving the thermal resistance, chemical resistance, wear resistance, and pollution resistance of the enamel, and due to the change in the composition and/or the composition ratio, an electrostatic performance of the enamel is reduced. That is, due to the reduction in the electrostatic performance of the enamel, a coating performance of the enamel is reduced, and thus, a performance of the enamel coated on the inside of a cooking appliance is reduced.

Therefore, it is required to develop a glass composition for solving the above-described problems.

SUMMARY

Accordingly, a glass composition with an enhanced electrostatic performance and coating performance is disclosed.

In one general aspect, a glass composition includes a glass frit and an electrostatic force reinforcing material including polymethylhydrosiloxane derivatives, wherein the electrostatic force reinforcing material is represented by the following Formula.

[Formula]

where $X > 0$, and $Y > 0$.

Other features and aspects will be apparent from the following detailed description, the drawings, and the claims.

DETAILED DESCRIPTION OF EMBODIMENTS

Hereinafter, a glass composition and a cooking appliance including the same according to embodiments will be described in detail with reference to the accompanying drawings.

Figure 1:
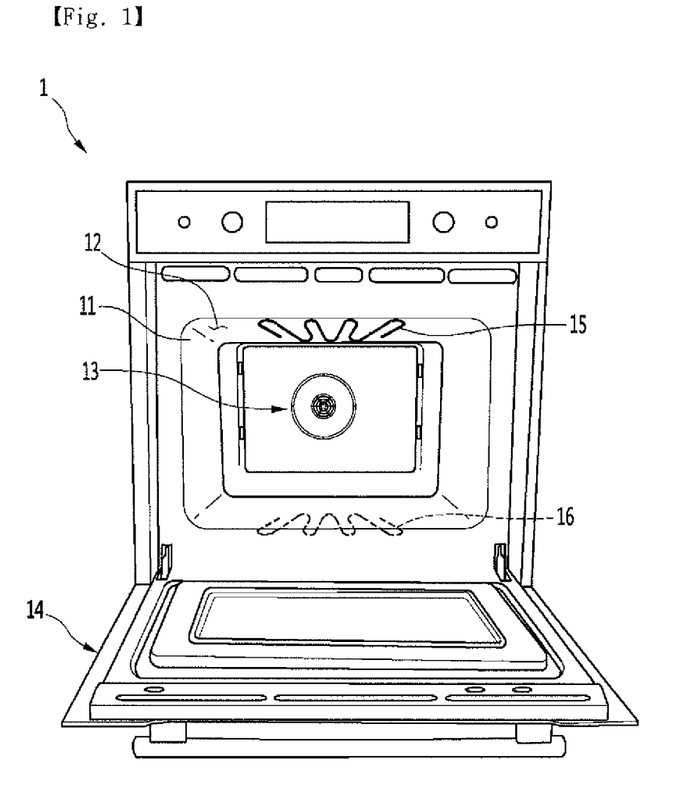
FIG. 1 is a front view of a cooking appliance according to an embodiment.

FIG. 1 is a front view of a cooking appliance 1 according to an embodiment.

Referring to FIG. 1, the cooking appliance 1 may include a cavity 11 where a cooking room 12 is provided, a door 14 which selectively opens or closes the cooking room 12, and at least one heating source which provides heat for heating food in the cooking room 12.

In detail, the cavity 11 may be provided in a hexahedral shape with a front surface opened. The heating source may include a convection assembly 13 which allows heated air to be discharged to the inside of the cavity 11, an upper heater 15 disposed on the cavity 11, and a lower heater 16 disposed under the cavity 11. The heating source may not include the convection assembly 13, the upper heater 15, and/or the lower heater 16. That is, the heating source may include at least one of the convection assembly 13, the upper heater 15, and the lower heater 16.

The upper heater 15 and the lower heater 16 may be provided inside or outside the cavity 11.

Referring to FIGS. 2 to 5, a function layer may be disposed on each of an inner side of the cavity 11 and a backside of the door 14.

The function layer may include a below-described glass composition. The function layer may be coated on each of the inner side of the cavity 11 and the backside of the door 14. That is, the function layer may be a coating layer.

The function layer enhances the thermal resistance, chemical resistance, and pollution resistance of each of the inner side of the cavity 11 and the backside of the door 14.

Figure 2:
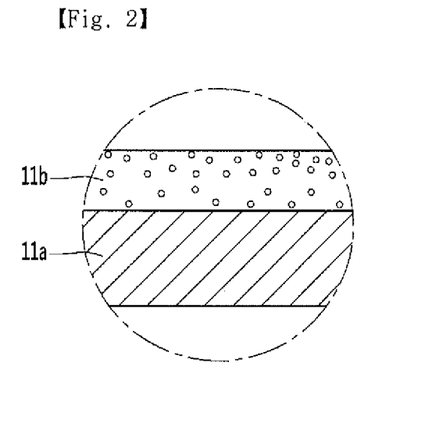
FIGS. 2 and 3 are enlarged cross-sectional views of a portion of an inner side of a cavity of FIG. 1.
Figure 3:
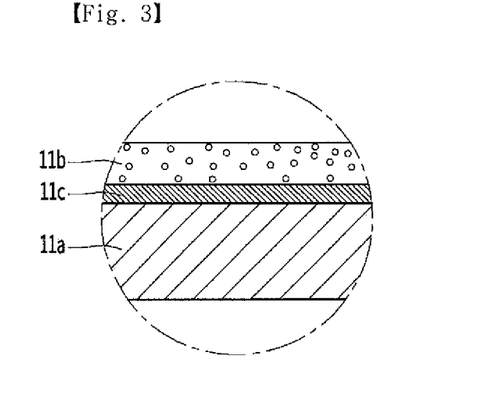

Referring to FIGS. 2 and 3, the function layer may be disposed in the cavity 11.

The cavity 11 may include a metal layer 11a and a function layer 11b on the metal layer 11a.

The metal layer 11a may be a parent material of the cavity.

Referring to FIG. 2, the function layer 11b may be disposed in direct contact with the metal layer 11a.

Alternatively, referring to FIG. 3, the function layer 11b may be disposed in indirect contact with the metal layer 11a. In detail, a buffer layer 11c may be disposed between the metal layer 11a and the function layer 11b. The buffer layer 11c may include an adhesive layer. That is, an adhesive force of the metal layer 11a and the function layer 11b is enhanced by the buffer layer 11c.

Figure 4:
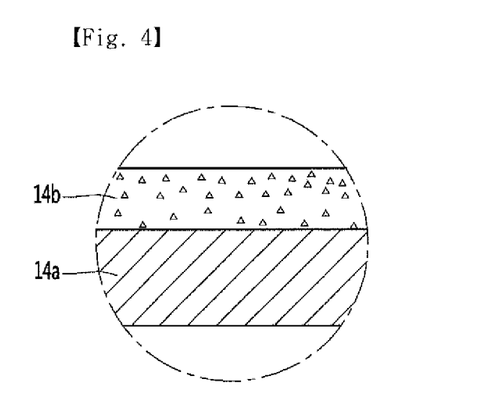
FIGS. 4 and 5 are enlarged cross-sectional views of a portion of a backside of a door of FIG. 1.
Figure 5:
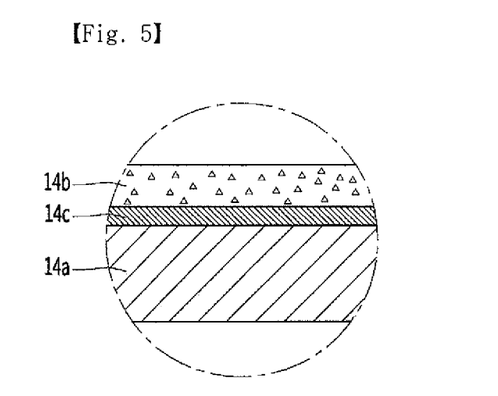

Referring to FIGS. 4 and 5, the function layer may be disposed on the backside of the door 14. In detail, in a state where the cooking room 12 is closed, the function layer may be disposed on the backside of the door 14 facing the cooking room 12. The function layer enhances the thermal resistance, chemical resistance, and pollution resistance of the backside of the door 14.

The door 14 may include a metal layer 14a and a function layer 14b on the metal layer 14a.

The metal layer 14a may be a parent material of the cavity 11.

Referring to FIG. 4, the function layer 14b may be disposed in direct contact with the metal layer 14a.

Alternatively, referring to FIG. 5, the function layer 14b may be disposed in indirect contact with the metal layer 14a. In detail, a buffer layer 14c may be disposed between the metal layer 14a and the function layer 14b. The buffer layer 14c may include an adhesive layer. That is, an adhesive force of the metal layer 14a and the function layer 14b is enhanced by the buffer layer 14c.

The function layer may be formed by coating the glass composition on the inner side of the cavity 11 or the backside of the door 14. In detail, the function layer may be coated on the inner side of the cavity 11 or the backside of the door 14, thereby enhancing the thermal resistance, chemical resistance, and pollution resistance of each of the inner side of the cavity 11 and the backside of the door 14.

Hereinafter, a glass composition coated on a cavity and a door of the cooking appliance will be described.

A glass composition according to an embodiment may include a glass frit and an electrostatic force reinforcing material.

The glass frit may include $P_2O_5$, $SiO_2$, Group I oxide, $Al_2O_3$, $B_2O_3$, $ZrO_2$, and other materials.

$P_2O_5$ may be added by about 50 wt % or less of the glass frit. In detail, $P_2O_5$ may be added by about 20 wt % to about 50 wt % of the glass frit.

$P_2O_5$ may be included in the glass composition, and a cleaning performance of the glass composition is enhanced. If $P_2O_5$ is added by less than about 20 wt % of the glass composition, the cleaning performance of the glass composition may be reduced. Also, if $P_2O_5$ is added by more than about 50 wt % of the glass frit, a thermal characteristic of the glass composition may be reduced, and a vitrification of the glass composition is weakened.

$SiO_2$ may be added by about 10 wt % or less of the glass frit. In detail, $SiO_2$ may be added by about 0.1 wt % to about 10 wt % of the glass frit.

$SiO_2$ may be included in the glass composition and may form a glass structure of the glass composition, thereby enhancing a frame of the glass structure and enhancing an acid resistance of the glass frit.

If $SiO_2$ is added by less than about 0.1 wt % of the glass frit, the glass structure of the glass composition may be degraded, causing a reduction in durability of the function layer. Also, $SiO_2$ is added by more than about 10 wt % of the glass frit, a cleaning performance of the glass frit may be reduced.

The Group I oxide may include at least one metal oxide of $Li_2O$, $Na_2O$, and $K_2O$. In detail, the Group I oxide may include $Li_2O$, $Na_2O$, and $K_2O$. That is, the glass frit may include all of $Li_2O$, $Na_2O$, and $K_2O$.

The Group I oxide may be added by about 12 wt % to about 38 wt % of the glass flit.

For example, $Li_2O$ may be added by about 0.1 wt % to about 3 wt % of the glass frit, $Na_2O$ may be added by about 10 wt % to about 25 wt % N of the glass frit, and $K_2O$ may be added by about 0.1 wt % to about 10 wt % of the glass frit.

The Group I oxide may be included in the glass composition, thereby enhancing the cleaning performance of the glass composition. That is, the Group I oxide enhances the cleaning performance of the glass composition along with $P_2O_5$.

If the Group I oxide is added by less than about 12 wt % of the glass frit, the cleaning performance of the glass composition may be reduced. Also, if Group I oxide is added by more than about 38 wt % of the glass frit, a thermal characteristic of the glass composition may be reduced.

$P_2O_5$, $Li_2O$, $Na_2O$, and $K_2O$ may form an alkali phosphate glass structure. Also, $P_2O_5$, $Li_2O$, $Na_2O$, and $K_2O$ may provide an enhanced cleaning performance to the glass composition according to an embodiment.

That is, since the glass frit may include $P_2O_5$, $Li_2O$, $Na_2O$, and $K_2O$, when the function layer, formed by the glass composition according to an embodiment, is polluted by food and/or the like, the function layer may be easily cleaned with water.

$Al_2O_3$ may be added by about 25 wt % or less of the glass frit. In detail, $Al_2O_3$ may be added by about 10 wt % to about 25 wt % of the glass frit.

If $Al_2O_3$ is added by less than about 10 wt % of the glass frit, the chemical resistance and durability of the glass composition may be reduced. Also, if $Al_2O_3$ is added by more than about 25 wt % of the glass frit, the cleaning performance of the glass composition may be reduced.

$B_2O_3$ may be added by about 5 wt % or less of the glass frit. In detail, $B_2O_3$ may be added by about 0.1 wt % to about 5 wt % of the glass frit.

$B_2O_3$ may enlarge a vitrification region of the glass frit, and a function of appropriately adjusting a thermal expansion coefficient of the glass composition according to an embodiment may be performed.

If $B_2O_3$ is added by less than about 0.1 wt % of the glass frit, the vitrification region may be narrowed, and for this reason, the glass structure is reduced, causing a reduction in durability of the function layer. Also, if $B_2O_3$ is added by more than about 5 wt % of the glass frit, the cleaning performance of the glass frit may be reduced.

$ZrO_2$ may be added by about 5 wt % or less of the glass frit. In detail, $ZrO_2$ may be added by about 0.1 wt % to about 5 wt % of the glass frit.

If $ZrO_2$ is added by less than about 0.1 wt % of the glass frit, the chemical resistance and durability of the glass composition may be reduced. Also, if $ZrO_2$ is added by more than about 5 wt % of the glass frit, the cleaning performance of the glass composition may be reduced.

$ZrO_2$ enhances the chemical durability of the glass frit. Particularly, $ZrO_2$ supplements, through structural stabilization, a low chemical durability of the alkali phosphate glass structure including $P_2O_5$, $Li_2O$, $Na_2O$, and $K_2O$.

The glass frit may further include an additional material in addition to the materials, based on usability.

For example, the glass frit may further include at least one of $TiO_2$, $SnO$, $ZnO$, $CaO$, $MgO$, $BaO$, $NaF$, $CaF_2$, $AlF_3$, $Co_3O_4$, $NiO$, $Fe_2O_3$, and $MnO_2$.

The additional material may be added by about 0.1 wt % to about 4 wt % of the glass frit.

The additional material may be associated with performances such as surface tension control, obliterating force, and adhesive force of the glass composition.

The above-described composition and composition ratio of the glass frit may be variously changed based on the usability of a glass power manufactured by the glass frit. That is, the composition and the composition ratio of the glass frit of the glass composition according to an embodiment are not limited to the above-described composition and composition ratio.

The electrostatic force reinforcing material may be mixed with the glass frit. The electrostatic force reinforcing material may react with the glass frit. The electrostatic force reinforcing material may be bonded to the glass frit. The electrostatic force reinforcing material may be chemically bonded to the glass frit.

The glass frit may be added by about 99 wt % or more of the glass composition. In detail, the glass frit may be added by about 99 wt % to about 99.85 wt % of the glass composition. In more detail, the glass frit may be added by about 99.6 wt % to about 99.85 wt % of the glass composition.

If the glass frit is added by less than about 99.6 wt % of the glass composition, functions such as the thermal resistance, chemical resistance, wear resistance, and pollution resistance of the glass composition may be reduced. That is, a content of the glass frit for realizing the functions such as the thermal resistance, chemical resistance, wear resistance, and pollution resistance of the glass composition may be reduced, and thus, the thermal resistance, chemical resistance, wear resistance, and pollution resistance of the glass composition are reduced.

Moreover, if the glass frit is added by more than about 99.85 wt % of the glass composition, a coating performance and an electrostatic performance realized by a material in addition to the glass frit may be reduced.

Moreover, the electrostatic force reinforcing material may be added by about 0.1 wt % or more of the glass composition. In detail, the electrostatic force reinforcing material may be added by about 0.1 wt % to about 0.3 wt % of the glass composition.

If the electrostatic force reinforcing material is added by less than about 0.1 wt % of the glass composition, an electrostatic performance and a coating performance realized by the electrostatic force reinforcing material may be reduced. Also, if the electrostatic force reinforcing material is added by more than about 0.3 wt % of the glass composition, a content of the glass frit in the glass composition may be reduced, and thus, the thermal resistance, chemical resistance, wear resistance, and pollution resistance of the glass composition may be reduced.

The electrostatic force reinforcing material may comprise a methylhydrosiloxane group, a dimethylsiloxane group, and a trimethylsiloxane group. For example, the electrostatic force reinforcing material may have a structure including the methylhydrosiloxane group, the dimethylsiloxane group, and the trimethylsiloxane group.

The electrostatic force reinforcing material may include polymethylhydrosiloxane derivatives. The electrostatic force reinforcing material may be represented by the following Formula 1.

[Formula 1]

In detail, the electrostatic force reinforcing material may have a structure where the trimethylsiloxane group is bonded to each of both ends of the electrostatic force reinforcing material, and the methylhydrosiloxane group and the dimethylsiloxane group are repeatedly bonded.

A repeating number X of the methylhydrosiloxane group may differ from a repeating number Y of the dimethylsiloxane group. Alternatively, the repeating number X of the methylhydrosiloxane group may be the same as the repeating number Y of the dimethylsiloxane group. In detail, the repeating number X of the methylhydrosiloxane group may be greater than, the same as, or different from the repeating number Y of the dimethylsiloxane group.

The repeating number X of the methylhydrosiloxane group may be 50 to 120. When the repeating number X of the methylhydrosiloxane group is less than 50 or more than 120, the coating performance and/or electrostatic performance of the glass composition may be reduced.

Moreover, the repeating number Y of the dimethylsiloxane group may be 10 to 50. When the repeating number Y of the dimethylsiloxane group is less than 10 or more than 50, the coating performance and/or electrostatic performance of the glass composition may be reduced.

Moreover, a total repeating number "X+Y" of the methylhydrosiloxane group and the dimethylsiloxane group may be 100 to 200. When the total repeating number "X+Y" of the methyhydrolsiloxane group and the dimethylsiloxane group is less than 100, the coating performance and/or electrostatic performance of the glass composition may be reduced. Also, when the total repeating number "X+Y" of the methylhydrosiloxane group and the dimethylsiloxane group is more than 200, the stability of the polymethylhydrosiloxane derivatives may be reduced, causing a reduction in stability of the electrostatic force reinforcing material.

The glass frit and the electrostatic force reinforcing material may be chemically bonded to each other. For example, the glass flit and the electrostatic force reinforcing material may be chemically bonded to each other in a structure where the electrostatic force reinforcing material surrounds an outer surface of a glass frit powder.

Figure 6:
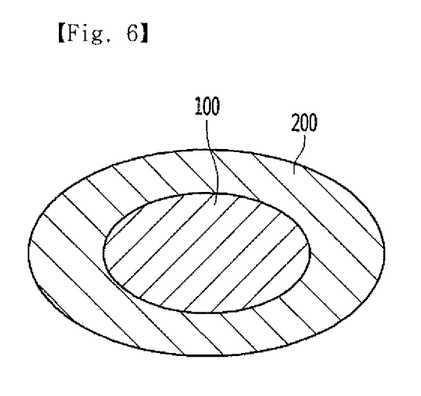
FIG. 6 is a cross-sectional view of a powder manufactured based on a glass composition according to an embodiment.

Referring to FIG. 6, for example, a glass powder manufactured by the glass composition may be formed in a structure where the electrostatic force reinforcing material 200 is coated on an outer side of the glass frit powder 100. That is, the electrostatic force reinforcing material may be an outer layer which surrounds an outer surface of the glass frit powder.

The glass composition may further include an additive. In detail, the glass composition may include an additive for realizing or promoting a reaction of the glass frit and the electrostatic force reinforcing material. That is, the additive may induce a bonding of the glass frit and the electrostatic force reinforcing material.

For example, the glass composition may further include an additive including amino silane. The animo silane may react with a functional group of the glass frit and may be bonded to the glass frit, thereby chemically bonding the glass composition to the electrostatic force reinforcing material.

In detail, the amino silane may include an amino group and an alkoxy group which includes a methoxy group and an ethoxy group. The amino group may react with a hydrogen group of the electrostatic force reinforcing material, and the alkoxy group may react with a hydroxyl group of the glass frit. Therefore, the glass frit and the electrostatic force reinforcing material may be chemically bonded to each other by using the amino silane.

The additive may be added by about 0.05 wt % of the glass composition. In detail, the additive may be added by about 0.05 wt % to about 0.1 wt % of the glass composition.

If the additive is added by less than about 0.05 wt % of the glass composition, a bonding force between the glass frit and the electrostatic force reinforcing material may be reduced. Also, if the additive is added by less than about 0.1 wt % of the glass composition, the coating performance, electrostatic performance, thermal resistance, chemical resistance, wear resistance, and pollution resistance of the glass composition realized by the glass frit and the electrostatic force reinforcing material may be reduced.

The glass composition may further include an alumina powder. The alumina powder may decrease an agglutination of unit powders where the glass frit and the electrostatic force reinforcing material are bonded to each other. In detail, the alumina powder prevents the unit powders from contacting each other or agglutinating between the unit powders.

Hereinafter, embodiments will be described in more detail with reference to a glass composition manufacturing method and comparative examples. Such embodiments are merely described as an example for describing the present invention in more detail. Therefore, the present invention is not limited to the embodiments.

Manufacturing of Glass Composition

As shown in the following Table 1, a glass frit material was manufactured.

In this case, $NH_4H_2PO_4$ was used as a raw material of $P_2O_5$, and $Na_2CO$, $K_2CO_3$, and $Li_2CO_3$ were respectively used as raw materials of $Na_2O$, $K_2O$, and $Li_2O$. As the other components, the materials shown in the following Table 1 were used.

Subsequently, the glass frit materials were mixed, subsequently melted for about one hour to about two hours at a temperature of about 1,400 degrees C., and then rapidly cooled in a quenching roller, thereby a glass cullet is obtained.

Subsequently, organicpolysiloxane of about 0.1 wt % to about 1 wt % was added to the glass cullet, milled for about four hours to about six hours by using a ball mill, and sieved to have a grain diameter of about 45 μm or less by using a mesh sieve 325, thereby forming the glass frit.

In this case, a glass frit milling process based on the ball mill process were performed at a room temperature. In the milling process, amino silane and polymethylhydrosiloxane derivatives represented by the following Formula 1 were added, and the glass frit and the polymethylhydrosiloxane were mixed, thereby a final glass composition was manufactured.

[Formula 1]

TABLE 1

| Composition | wt % |
|---|---|
| $P_2O_5$ | 40 |
| $Al_2O_3$ | 18 |
| $Na_2O$ | 12 |
| $K_2O$ | 7 |
| $Li_2O$ | 7 |
| $SiO_2$ | 3 |
| $B_2O_3$ | 3 |
| $ZrO_2$ | 3 |
| Other | 3 |

Subsequently, an electrostatic performance and a coating performance were measured based on a ratio of the glass frit, the polymethylhydrosiloxane, and the amino silane.

In the electrostatic performance, a resistivity value of a function layer was measured.

In the Formula of the polymethylhydrosiloxane, X is 60, and Y is 30.

Embodiment 1

The glass frit according to Table 1 was added by 99.84 wt % of the glass composition, the polymethylhydrosiloxane was added by 0.1 wt % of the glass composition, and the amino silane was added by 0.06 wt % of the glass composition.

Subsequently, by using a corona discharge gun, the glass composition was sprayed on a low-carbon steel sheet having an area of 200×200 mm and a thickness of 1 mm or less. A voltage of the corona discharge gun was controlled to a condition of 40 kV to 100 kV, and the amount of the glass composition sprayed on the low-carbon steel sheet is 300 g/m².

Subsequently, the low-carbon steel sheet with the glass composition sprayed thereon was fired for 300 seconds to 450 seconds at a temperature of 830 degrees C. to 870 degrees C., thereby a function layer on one surface of the low-carbon steel sheet was formed.

Subsequently, the electrostatic performance and coating performance of the function layer were measured.

In this case, a resistance of a glass powder manufactured by the glass composition was measured. In the coating performance, an adhesive force of the glass composition manufactured by the glass powder was measured.

The adhesive force of the function layer was measured until a glass frit powder is sprayed on a parent material and was loaded into a firing furnace.

In detail, a glass composition layer was formed by spray-coating the glass frit powder, and then, an impact was applied to the glass composition layer. Subsequently, by measuring a ratio of a before-impact glass frit powder to an after-impact glass frit powder of the glass composition layer, the adhesive force of the function layer was measured.

Embodiment 2

Except that a glass composition was manufactured based on a condition where the glass frit of Table 1 was added by 99.79 wt % of the glass composition, the polymethylhydrosiloxane was added by 0.15 wt % of the glass composition, and the amino silane was added by 0.06 wt % of the glass composition, a function layer was formed identically to the glass composition of Embodiment 1, and then, the electrostatic performance and coating performance of the function layer were measured.

Embodiment 3

Except that a glass composition was manufactured based on a condition where the glass frit of Table 1 was added by 99.74 wt % of the glass composition, the polymethylhydrosiloxane was added by 0.2 wt % of the glass composition, and the amino silane was added by 0.06 wt % of the glass composition, a function layer was formed identically to the glass composition of Embodiment 1, and then, the electrostatic performance and coating performance of the function layer were measured.

Embodiment 4

Except that a glass composition is manufactured based on a condition where the glass frit of Table 1 was added by 99.69 wt % of the glass composition, the polymethylhydrosiloxane was added by 0.25 wt % of the glass composition, and the amino silane was added by 0.06 wt % of the glass composition, a function layer was formed identically to the glass composition of Embodiment 1, and then, the electrostatic performance and coating performance of the function layer were measured.

Embodiment 5

Except that a glass composition was manufactured based on a condition where the glass frit of Table 1 was added by 99.64 wt % of the glass composition, the polymethylhydrosiloxane was added by 0.3 wt % of the glass composition, and the amino silane was added by 0.06 wt % of the glass composition, a function layer was formed identically to the glass composition of Embodiment 1, and then, the electrostatic performance and coating performance of the function layer were measured.

Comparative Example 1

Except that a glass composition was manufactured based on a condition where the glass flit of Table 1 was added by 99.94 wt % of the glass composition and the amino silane was added by 0.06 wt % of the glass composition, a function layer is formed identically to the glass composition of Embodiment 1, and then, the electrostatic performance and coating performance of the function layer were measured.

Comparative Example 2

Except that a glass composition was manufactured based on a condition where the glass frit of Table 1 was added by 99.89 wt % of the glass composition, the polymethylhydrosiloxane was added by 0.05 wt % of the glass composition, and the amino silane was added by 0.06 wt % of the glass composition, a function layer was formed identically to the glass composition of Embodiment 1, and then, the electrostatic performance and coating performance of the function layer were measured.

Comparative Example 3

Except that a glass composition is manufactured based on a condition where the glass frit of Table 1 was added by 99.59 wt % of the glass composition, the polymethylhydrosiloxane was added by 0.35 wt % of the glass composition, and the amino silane was added by 0.06 wt % of the glass composition, a function layer was formed identically to the glass composition of Embodiment 1, and then, the electrostatic performance and coating performance of the function layer were measured.

TABLE 2

| | Electrostatic Performance ($*10^{13}$ Ωm) | Coating Performance (ratio of after-impact glass composition to before-impact glass composition) |
|---|---|---|
| Embodiment 1 | 1.3 | 20 |
| Embodiment 2 | 2.3 | 20 |
| Embodiment 3 | 6.5 | 60 |
| Embodiment 4 | 5.9 | 60 |
| Embodiment 5 | 3.0 | 50 |
| Comparative Example 1 | 0.01 or less | 0 |
| Comparative Example 2 | 1.1 | 10 |
| Comparative Example 3 | 0.9 | 10 |

Referring to Table 2, it can be seen that the electrostatic performance and coating performance of a function layer manufactured by a glass composition of each of Embodiments 1 to 5 are more enhanced than the electrostatic performance and coating performance of a function layer manufactured by a glass composition of each of Comparative examples 1 to 3.

Embodiment 6

A glass composition was manufactured based on a condition where the glass frit of Table 1 was added by 99.75 wt % of the glass composition, the polymethylhydrosiloxane was added by 0.2 wt % of the glass composition, and the amino silane was added by 0.05 wt % of the glass composition.

Subsequently, by using the corona discharge gun, the glass composition was sprayed on a low-carbon steel sheet having an area of 200×200 mm and a thickness of 1 mm or less. A voltage of the corona discharge gun was controlled to a condition of 40 kV to 100 kV, and the amount of the glass composition sprayed on the low-carbon steel sheet was 300 g/m².

Subsequently, the low-carbon steel sheet with the glass composition sprayed thereon was fired for 300 seconds to 450 seconds at a temperature of 830 degrees C. to 870 degrees C., thereby a function layer on one surface of the low-carbon steel sheet was formed.

Subsequently, the electrostatic performance and coating performance of the function layer were measured.

Embodiment 7

Except that a glass composition was manufactured based on a condition where the glass frit of Table 1 was added by 99.725 wt % of the glass composition, the polymethylhydrosiloxane was added by 0.2 wt % of the glass composition, and the amino silane was added by 0.075 wt % of the glass composition, a function layer was formed identically to the glass composition of Embodiment 6, and then, the electrostatic performance and coating performance of the function layer were measured.

Embodiment 8

Except that a glass composition was manufactured based on a condition where the glass frit of Table 1 was added by 99.7 wt % of the glass composition, the polymethylhydrosiloxane was added by 0.2 wt % of the glass composition, and the amino silane was added by 0.1 wt % of the glass composition, a function layer was formed identically to the glass composition of Embodiment 6, and then, the electrostatic performance and coating performance of the function layer were measured.

Comparative Example 4

Except that a glass composition was manufactured based on a condition where the glass frit of Table 1 was added by 99.8 wt % of the glass composition and the polymethylhydrosiloxane was added by 0.2 wt % of the glass composition, a function layer was formed identically to the glass composition of Embodiment 6, and then, the electrostatic performance and coating performance of the function layer were measured.

Comparative Example 5

Except that a glass composition was manufactured based on a condition where the glass frit of Table 1 was added by 99.775 wt % of the glass composition, the polymethylhydrosiloxane was added by 0.2 wt % of the glass composition, and the amino silane was added by 0.025 wt % of the glass composition, a function layer was formed identically to the glass composition of Embodiment 6, and then, the electrostatic performance and coating performance of the function layer were measured.

Comparative Example 6

Except that a glass composition was manufactured based on a condition where the glass frit of Table 1 was added by 99.675 wt % of the glass composition, the polymethylhydrosiloxane was added by 0.2 wt % of the glass composition, and the amino silane was added by 0.125 wt % of the glass composition, a function layer was formed identically to the glass composition of Embodiment 6, and then, the electrostatic performance and coating performance of the function layer were measured.

TABLE 3

| | Electrostatic Performance ($*10^{13}$ Ωm) | Coating Performance (ratio of after-impact glass composition to before-impact glass composition) |
|---|---|---|
| Embodiment 6 | 5.9 | 55 |
| Embodiment 7 | 6.5 | 60 |
| Embodiment 8 | 2.3 | 20 |
| Comparative Example 4 | 0.01 or less | 0 |
| Comparative Example 5 | 1.3 | 10 |
| Comparative Example 6 | 1.8 | 10 |

Referring to Table 3, it can be seen that the electrostatic performance and coating performance of a function layer manufactured by a glass composition of each of Embodiments 6 to 8 are more enhanced than the electrostatic performance and coating performance of a function layer manufactured by a glass composition of each of Comparative Examples 4 to 6.

Subsequently, the electrostatic performance and coating performance of a function layer based on a repeating number Y of the dimethylsiloxane group and a repeating number X of the methylhydrosiloxane group of the polymethylhydrosiloxane derivatives were measured.

Embodiment 9

A function layer was formed identically to the glass composition of Embodiment 7, and then, the electrostatic performance and coating performance of the function layer were measured.

In this case, in the polymethylhydrosiloxane derivatives, the repeating number X of the methylhydrosiloxane group was 60, and the repeating number Y of the dimethylsiloxane group is 30.

Embodiment 10

Except that in the polymethylhydrosiloxane derivatives, the repeating number X of the methylhydrosiloxane group was 80, and the repeating number Y of the dimethylsiloxane group was 30, a function layer was formed identically to the glass composition of Embodiment 9, and then, the electrostatic performance and coating performance of the function layer were measured.

Embodiment 11

Except that in the polymethylhydrosiloxane derivatives, the repeating number X of the methylhydrosiloxane group was 90, and the repeating number Y of the dimethylsiloxane group was 30, a function layer was formed identically to the glass composition of Embodiment 9, and then, the electrostatic performance and coating performance of the function layer were measured.

Embodiment 12

Except that in the polymethylhydrosiloxane derivatives, the repeating number X of the methylhydrosiloxane group is 100, and the repeating number Y of the dimethylsiloxane group was 30, a function layer was formed identically to the glass composition of Embodiment 9, and then, the electrostatic performance and coating performance of the function layer were measured.

Embodiment 13

Except that in the polymethylhydrosiloxane derivatives, the repeating number X of the methylhydrosiloxane group was 60, and the repeating number Y of the dimethylsiloxane group was 40, a function layer was formed identically to the glass composition of Embodiment 9, and then, the electrostatic performance and coating performance of the function layer were measured.

Embodiment 14

Except that in the polymethylhydrosiloxane derivatives, the repeating number X of the methylhydrosiloxane group was 90, and the repeating number Y of the dimethylsiloxane group was 40, a function layer was formed identically to the glass composition of Embodiment 9, and then, the electrostatic performance and coating performance of the function layer were measured.

Comparative Example 7

Except that in the polymethylhydrosiloxane derivatives, the repeating number X of the methylhydrosiloxane group was 20, and the repeating number Y of the dimethylsiloxane group was 0, a function layer was formed identically to the glass composition of Embodiment 9, and then, the electrostatic performance and coating performance of the function layer were measured.

Comparative Example 8

Except that in the polymethylhydrosiloxane derivatives, the repeating number X of the methylhydrosiloxane group was 40, and the repeating number Y of the dimethylsiloxane group was 0, a function layer was formed identically to the glass composition of Embodiment 9, and then, the electrostatic performance and coating performance of the function layer were measured.

Comparative Example 9

Except that in the polymethylhydrosiloxane derivatives, the repeating number X of the methylhydrosiloxane group was 60, and the repeating number Y of the dimethylsiloxane group was 0, a function layer was formed identically to the glass composition of Embodiment 9, and then, the electrostatic performance and coating performance of the function layer were measured.

Comparative Example 10

Except that in the polymethylhydrosiloxane derivatives, the repeating number X of the methylhydrosiloxane group was 90, and the repeating number Y of the dimethylsiloxane group was 0, a function layer was formed identically to the glass composition of Embodiment 9, and then, the electrostatic performance and coating performance of the function layer were measured.

Comparative Example 11

Except that in the polymethylhydrosiloxane derivatives, the repeating number X of the methylhydrosiloxane group was 60, and the repeating number Y of the dimethylsiloxane group was 4, a function layer was formed identically to the glass composition of Embodiment 9, and then, the electrostatic performance and coating performance of the function layer were measured.

Comparative Example 12

Except that in the polymethylhydrosiloxane derivatives, the repeating number X of the methylhydrosiloxane group was 75, and the repeating number Y of the dimethylsiloxane group was 4, a function layer was formed identically to the glass composition of Embodiment 9, and then, the electrostatic performance and coating performance of the function layer were measured.

Comparative Example 13

Except that in the polymethylhydrosiloxane derivatives, the repeating number X of the methylhydrosiloxane group was 90, and the repeating number Y of the dimethylsiloxane group was 10, a function layer was formed identically to the glass composition of Embodiment 9, and then, the electrostatic performance and coating performance of the function layer were measured.

Comparative Example 14

Except that in the polymethylhydrosiloxane derivatives, the repeating number X of the methylhydrosiloxane group was 120, and the repeating number Y of the dimethylsiloxane group was 0, a function layer was formed identically to the glass composition of Embodiment 9, and then, the electrostatic performance and coating performance of the function layer were measured.

Comparative Example 15

Except that in the polymethylhydrosiloxane derivatives, the repeating number X of the methylhydrosiloxane group was 160, and the repeating number Y of the dimethylsiloxane group was 0, a function layer was formed identically to the glass composition of Embodiment 9, and then, the electrostatic performance and coating performance of the function layer were measured.

Comparative Example 16

Except that in the polymethylhydrosiloxane derivatives, the repeating number X of the methylhydrosiloxane group was 30, and the repeating number Y of the dimethylsiloxane group was 30, a function layer was formed identically to the glass composition of Embodiment 9, and then, the electrostatic performance and coating performance of the function layer were measured.

Comparative Example 17

Except that in the polymethylhydrosiloxane derivatives, the repeating number X of the methylhydrosiloxane group was 120, and the repeating number Y of the dimethylsiloxane group was 30, a function layer was formed identically to the glass composition of Embodiment 9, and then, the electrostatic performance and coating performance of the function layer were measured.

Comparative Example 18

Except that in the polymethylhydrosiloxane derivatives, the repeating number X of the methylhydrosiloxane group was 160, and the repeating number Y of the dimethylsiloxane group was 30, a function layer was formed identically to the glass composition of Embodiment 9, and then, the electrostatic performance and coating performance of the function layer were measured.

Comparative Example 19

Except that in the polymethylhydrosiloxane derivatives, the repeating number X of the methylhydrosiloxane group was less than 50, and the repeating number Y of the dimethylsiloxane group was more than 50, a function layer was formed identically to the glass composition of Embodiment 9, and then, the electrostatic performance and coating performance of the function layer were measured.

Comparative Example 20

Except that in the polymethylhydrosiloxane derivatives, the repeating number X of the methylhydrosiloxane group was 60, and the repeating number Y of the dimethylsiloxane group was 60, a function layer was formed identically to the glass composition of Embodiment 9, and then, the electrostatic performance and coating performance of the function layer were measured.

Comparative Example 21

Except that in the polymethylhydrosiloxane derivatives, the repeating number X of the methylhydrosiloxane group was 80, and the repeating number Y of the dimethylsiloxane group was 50, a function layer was formed identically to the glass composition of Embodiment 9, and then, the electrostatic performance and coating performance of the function layer were measured.

Comparative Example 22

Except that in the polymethylhydrosiloxane derivatives, the repeating number X of the methylhydrosiloxane group was 60, and the repeating number Y of the dimethylsiloxane group was 120, a function layer was formed identically to the glass composition of Embodiment 9, and then, the electrostatic performance and coating performance of the function layer were measured.

Comparative Example 23

Except that in the polymethylhydrosiloxane derivatives, the repeating number X of the methylhydrosiloxane group was 60, and the repeating number Y of the dimethylsiloxane group was 180, a function layer was formed identically to the glass composition of Embodiment 9, and then, the electrostatic performance and coating performance of the function layer were measured.

Comparative Example 24

Except that in the polymethylhydrosiloxane derivatives, the repeating number X of the methylhydrosiloxane group was 120, and the repeating number Y of the dimethylsiloxane group was 50, a function layer was formed identically to the glass composition of Embodiment 9, and then, the electrostatic performance and coating performance of the function layer were measured.

TABLE 4

| | Electrostatic Performance (*$10^{13}$ Ωm) | Coating Performance (ratio of after-impact glass composition to before-impact glass composition) |
|---|---|---|
| Embodiment 9 | 5.5 | 55 |
| Embodiment 10 | 6 | 60 |
| Embodiment 11 | 6.5 | 60 |
| Embodiment 12 | 5.5 | 55 |
| Embodiment 13 | 4.5 | 40 |
| Embodiment 14 | 7.1 | 60 |
| Comparative Example 7 | 0.5 | 5 |
| Comparative Example 8 | 2.1 | 10 |
| Comparative Example 9 | 3.5 | 10 |
| Comparative Example 10 | 4.5 | 30 |
| Comparative Example 11 | 3.5 | 20 |
| Comparative Example 12 | 4.2 | 30 |
| Comparative Example 13 | 4.5 | 35 |
| Comparative Example 14 | 2.2 | 10 |
| Comparative Example 15 | 1.5 | 10 |
| Comparative Example 16 | 2.5 | 10 |
| Comparative Example 17 | 2.0 | 10 |
| Comparative Example 18 | 1.3 | 10 |
| Comparative Example 19 | X | X |
| Comparative Example 20 | 2.8 | 15 |
| Comparative Example 21 | 5.7 | 45 |
| Comparative Example 22 | 2.5 | 15 |
| Comparative Example 23 | 2.5 | 15 |
| Comparative Example 24 | X | X |

Referring to Table 4, it can be seen that the electrostatic performance and coating performance of a function layer manufactured by a glass composition of each of Embodiments 9 to 14 provides more enhanced electrostatic performance and coating performance than a function layer manufactured by a glass composition of each of Comparative Examples 7 to 24.

As described above, the glass composition according to the embodiments has an enhanced electrostatic performance and coating performance.

Therefore, when the glass composition according to the embodiments is applied as a function layer of the cooking appliance, a reliability of the function layer is enhanced.

That is, the function layer manufactured based on the glass composition according to the embodiments has an enhanced electrostatic performance, and thus, a coating performance is prevented from being reduced due to a recovery powder in coating.

That is, recovery powders can occur when a glass powder including the glass composition is being spray-coated by using the corona discharge gun. In this case, since the glass powder including the glass composition according to the embodiments has an enhanced electrostatic performance, the electrostatic performance is prevented from being reduced in spray-coating, and thus, despite mixing of recovery powders, a function layer with an enhanced coating performance is formed.

Accordingly, the function layer manufactured by the glass powder including the glass composition according to the embodiments has an enhanced coating performance.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A glass composition comprising:
a glass frit; and
an electrostatic force reinforcing material including polymethylhydrosiloxane derivatives represented by Formula 1:

[Formula I]

where X > 0, and Y > 0 wherein
the glass frit is included in an amount of 99.6 wt % to 99.85 wt % in the glass composition, and
the electrostatic force reinforcing material is included in an amount of 0.1 wt % to 0.3 wt % in the glass composition.
2. The glass composition of claim 1, wherein X is within a range of 50≤X≤120, and Y is within a range of 10≤Y≤50.
3. The glass composition of claim 1, wherein X+Y is within a range of 100≤X+Y≤200.
4. The glass composition of claim 1, further comprising:
an additive reacting with the glass frit and the polymethylhydrosiloxane derivatives, wherein the additive comprises amino silane.

5. The glass composition of claim 4, wherein the amino silane is included in an amount of 0.05 wt % to 0.1 wt % in the glass composition.

6. The glass composition of claim 1, wherein the glass frit comprises $P_2O_5$, $SiO_2$, Group I oxide, $Al_2O_3$, $B_2O_3$, or $ZrO_2$.

7. A glass powder comprising:
a glass frit powder; and
an outer layer surrounding an outer surface of the glass frit powder, the outer layer including an electrostatic force reinforcing material including polymethylhydrosiloxane derivatives represented by Formula I:

[Formula 1]

where X > 0, and Y > 0.

wherein
the glass frit powder is included in an amount of 99.6 wt % to 99.85 wt % in the glass powder, and
the electrostatic force reinforcing material is included in an amount of 0.1 wt % to 0.3 wt % in the glass powder.

8. The glass powder of claim 7, wherein X is within a range of 50≤X≤120, and Y is within a range of 10≤Y≤50.

9. The glass powder of claim 7, wherein X+Y is within a range of 100≤X+Y≤200.

10. The glass powder of claim 7, further comprising: amino silane reacting with the glass frit powder and the polymethylhydrosiloxane derivatives.

11. The glass powder of claim 10, wherein the amino silane is included in an amount of 0.05 wt % to 0.1 wt % in the glass powder.

12. The glass powder of claim 7, wherein the glass frit powder comprises $P_2O_5$, $SiO_2$, Group I oxide, $Al_2O_3$, $B_2O_3$, or $ZrO_2$.

13. A cooking appliance comprising:
a cavity, wherein a cooking room being provided in the cavity;
a door selectively opening or closing the cooking room; and
at least one heating source providing heat for heating food cooked in the cooking room,
wherein
at least one of the cavity and the door comprises a parent metal material and a function layer on the parent metal material,
the function layer comprises a glass frit and an electrostatic force reinforcing material including polymethylhydrosiloxane derivatives represented by Formula 1:

[Formula 1]

where X > 0, and Y > 0, wherein
the glass frit is included in an amount of 99.6 wt % to 99.85 wt % in the function layer, and
the electrostatic force reinforcing material is included in an amount of 0.1 wt % to 0.3 wt % in the function layer.

14. The cooking appliance of claim 13, wherein
X is within a range of 50≤X≤120 and Y is within a range of 10≤Y≤50, or
X+Y is within a range of 100≤X+Y≤200.

15. The cooking appliance of claim 13, wherein the function layer further comprises: amino silane reacting with the glass frit and the polymethylhydrosiloxane derivatives.

16. The cooking appliance of claim 15, wherein the amino silane is included in an amount of 0.05 wt % to 0.1 wt % in the function layer.

17. The cooking appliance of claim 13, further comprising a buffer layer disposed between the parent metal material and the function layer.

* * * * *